US012623717B2

(12) United States Patent
Je et al.

(10) Patent No.: US 12,623,717 B2
(45) Date of Patent: May 12, 2026

(54) APPARATUS AND METHOD FOR DETECTING FAILURE OF TORQUE SENSOR FOR MOTOR-DRIVEN POWER STEERING SYSTEM

(71) Applicant: HYUNDAI MOBIS CO., LTD., Seoul (KR)

(72) Inventors: Sung Kyu Je, Yongin-si (KR); Won Mo Yang, Yongin-si (KR); Ji Hoon Yoo, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 281 days.

(21) Appl. No.: 18/188,616

(22) Filed: Mar. 23, 2023

(65) Prior Publication Data

US 2024/0227926 A1 Jul. 11, 2024

(30) Foreign Application Priority Data

Jan. 10, 2023 (KR) ........................ 10-2023-0003411

(51) Int. Cl.
B62D 5/04 (2006.01)
G01L 5/22 (2006.01)
G01L 27/00 (2006.01)

(52) U.S. Cl.
CPC .............. B62D 5/049 (2013.01); G01L 5/221 (2013.01); G01L 27/007 (2013.01)

(58) Field of Classification Search
CPC ........ B62D 5/049; G01L 5/221; G01L 27/007
See application file for complete search history.

(56) References Cited

U.S. PATENT DOCUMENTS

2002/0120378 A1* 8/2002 Kawada ............... B62D 5/0484
180/443
2006/0278467 A1* 12/2006 Endo ...................... B62D 5/049
180/446
(Continued)

FOREIGN PATENT DOCUMENTS

DE 10 2009 005 836 A1 7/2010
DE 10 2018 218 103 A1 4/2019
(Continued)

OTHER PUBLICATIONS

German Office Action issued on Jan. 15, 2024, in counterpart German Patent Application No. 10 2023 107 379.6 (5 pages in German).

*Primary Examiner* — Mohamad O El Sayah
(74) *Attorney, Agent, or Firm* — NSIP Law

(57) ABSTRACT

Disclosed are apparatuses and methods for detecting a failure of a torque sensor for a motor-driven power steering system, the apparatus including a processor configured to detect a failure in a first torque sensor and a second torque sensor based on main torque signals and sub-torque signals, compare a first torque value of the first torque sensor and a second torque value of the second torque sensor, in response to the first torque sensor and the second torque sensor being normal, measure an amount of change in first torque of the first torque sensor and an amount of change in second torque of the second torque sensor by applying electric current to a motor, in response to the comparison result being abnormal, and determine a failure in the first torque sensor and the second torque sensor based on the amount of change in first torque and second torque.

12 Claims, 4 Drawing Sheets

100

(56)                    References Cited

U.S. PATENT DOCUMENTS

| | | | |
|---|---|---|---|
| 2006/0282565 A1* | 12/2006 | Kumaido | B62D 5/0493 |
| | | | 710/41 |
| 2007/0000717 A1* | 1/2007 | Kumaido | B62D 5/0481 |
| | | | 180/446 |
| 2011/0218704 A1* | 9/2011 | Kanekawa | B62D 5/049 |
| | | | 701/29.2 |
| 2013/0253773 A1* | 9/2013 | Itamoto | B62D 5/0484 |
| | | | 701/43 |
| 2013/0261894 A1* | 10/2013 | Kojima | B62D 6/00 |
| | | | 701/41 |
| 2016/0229445 A1 | 8/2016 | Sasaki et al. | |
| 2017/0015348 A1* | 1/2017 | Sasaki | B62D 6/00 |
| 2018/0229761 A1* | 8/2018 | Fujita | G01L 5/221 |
| 2019/0118857 A1 | 4/2019 | Won | |
| 2020/0039574 A1* | 2/2020 | Kurihara | B62D 5/0463 |
| 2020/0055542 A1* | 2/2020 | Yamamoto | B62D 5/0481 |
| 2022/0063643 A1* | 3/2022 | Fujiwara | B62D 5/049 |

FOREIGN PATENT DOCUMENTS

| | | |
|---|---|---|
| DE | 11 2014 004 320 B4 | 1/2021 |
| KR | 10-2008-0078428 | 8/2008 |

* cited by examiner

Figure 2:
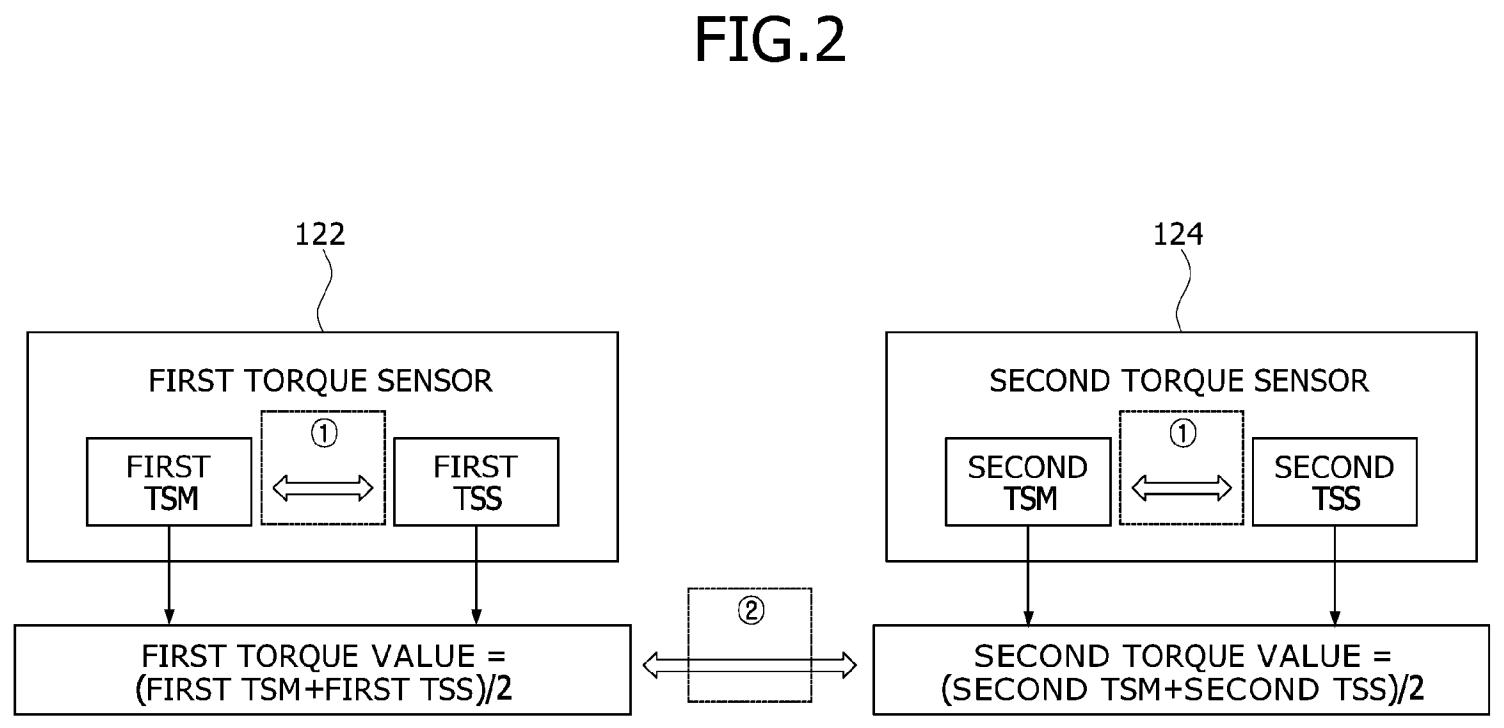

SECOND TORQUE SENSOR

SECOND TSM

① ⇕

SECOND TSS

SECOND TORQUE VALUE = (SECOND TSM+SECOND TSS)/2

②

122

FIRST TORQUE SENSOR

FIRST TSM

① ⇕

FIRST TSS

FIRST TORQUE VALUE = (FIRST TSM+FIRST TSS)/2

APPARATUS AND METHOD FOR DETECTING FAILURE OF TORQUE SENSOR FOR MOTOR-DRIVEN POWER STEERING SYSTEM

CROSS-REFERENCE TO RELATED APPLICATION

This application claims the benefit under 35 USC § 119(a) of Korean Patent Application No. 10-2023-0003411, filed on Jan. 10, 2023, the entire disclosure of which are incorporated herein by reference for all purposes.

BACKGROUND

1. Field

The present disclosure relate to an apparatus and method for detecting a failure of a torque sensor for a motor-driven power steering system, which is capable of normally detecting a failure of a torque sensor when a torque signal within a normal range set for failure detection is transmitted even though the torque sensor is damaged by external environmental factors.

2. Description of Related Art

In general, a motor-driven power steering (MDPS) system uses an electric motor and provides auxiliary torque in a direction in which a driver steers a vehicle, thereby allowing the driver to smoothly handle a steering wheel. Unlike a hydraulic power steering (HPS) system in the related art, the motor-driven power steering system automatically can control an operation of the electric motor on the basis of a traveling condition of the vehicle, thereby improving steering performance and steering operability. In this case, the motor-driven power steering system includes a torque sensor configured to measure steering torque of the driver inputted to the steering wheel, a steering angle sensor configured to measure a steering angle of the steering wheel, a vehicle speed sensor configured to measure a vehicle speed, and the like and determines the traveling condition of the vehicle.

Meanwhile, recently, two torque sensors have been used for the motor-driven power steering system in order to improve a redundancy operation. In case that one torque sensor fails, the motor-driven power steering system normally operates by using the other normal torque sensor. In case that the two torque sensors fail, the motor-driven power steering system is switched to a manual mode. In this case, the failure of each of the torque sensors is detected by checking a normal range of a voltage value of a torque signal and comparing two torque voltage values in the torque sensors. That is, the detection of the failure of the torque sensor is performed by checking whether the torque voltage values of the two torque sensors are within the normal range and checking whether a torque voltage difference is within a normal range. When the voltage value deviates from the normal range, the torque sensor is diagnosed with a failure.

The detection of the failure of the torque sensor may be performed in case that a voltage out of a normal range is transmitted as the torque signal is short-circuited/opened with an adjacent reference voltage, GND, or the like. However, in case that a voltage within a normal range is transmitted even though the torque sensor is damaged by external environmental factors such as water (salt or corrosion), the failure of the torque sensor cannot be normally detected. For this reason, there is a problem in that an abnormal torque value is consistently used, which causes dangerous traveling such as a self-rotation.

The background technology of the present disclosure is disclosed in Korean Patent Application Laid-Open No. 2008-0078428 (published on Aug. 27, 2008 and entitled "Torque Sensor Center Point Compensation Method For Use In Electric Power Steering Apparatus").

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an apparatus for detecting a failure of a torque sensor for a motor-driven power steering system, the apparatus including torque sensors including a first torque sensor and a second torque sensor, and a processor configured to determine that there is not a failure in the first torque sensor and the second torque sensor on the basis of main torque signals and sub-torque signals of the first torque sensor and the second torque sensor, respectively, in response to the determining that there is not a failure in the first torque sensor and the second torque sensor, compare a first torque value of the first torque sensor and a second torque value of the second torque sensor, measure an amount of change in first torque of the first torque sensor and an amount of change in second torque of the second torque sensor by applying electric current to a motor, in response to the comparison result being abnormal, and determine a failure in the first torque sensor and the second torque sensor on the basis of the amount of change in first torque and the amount of change in second torque, respectively.

The processor may be configured to calculate a first difference between a column torque value of a first main torque signal of the first torque sensor and a column torque value of a first sub-torque signal of the first torque sensor, and diagnose the first torque sensor with a failure, in response to the first difference being larger than a first reference torque value and equal to or smaller than a second reference torque value for a first reference time or more or in response to the first difference being larger than the second reference torque value for a second reference time or more.

The processor may be configured to calculates a second difference between a column torque value of a second main torque signal of the second torque sensor and a column torque value of a second sub-torque signal of the second torque sensor, and diagnose the second torque sensor with a failure, in response to the second difference being larger than the first reference torque value and equal to or smaller than the second reference torque value for the first reference time or more or in response to the second difference being larger than the second reference torque value for the second reference time or more.

The first reference torque value may be smaller than the second reference torque value, and the first reference time may be longer than the second reference time.

The processor may be configured to calculate the first torque value based on a column torque value of a first main torque signal of the first torque sensor and a column torque value of a first sub-torque signal of the first torque sensor, and calculate the second torque value based on a column torque value of a second main torque signal of the second torque sensor and a column torque value of a second sub-torque signal of the second torque sensor.

The processor may be configured to calculates a third difference between the first torque value and the second torque value, and determine that the first torque sensor or the second torque sensor is abnormal, in response to the third difference being larger than a third reference torque value and equal to or smaller than a fourth reference torque value for a third reference time or more or the third difference being larger than the fourth reference torque value for a fourth reference time or more.

The third reference torque value may be smaller than the fourth reference torque value, and the third reference time may be longer than the fourth reference time.

The processor may be configured to determine that the first torque sensor is normal, in response to the amount of change in first torque varying, determine that the first torque sensor is failing, in response to the amount of change in first torque not varying, determine that the second torque sensor is normal, in response to the amount of change in second torque varying, and determine that the second torque sensor fails, in response to the amount of change in second torque not varying.

In response to a vehicle being turned on, the processor may be configured to select a normal torque sensor between the first torque sensor and the second torque sensor on the basis of torque sensor failure information stored in a memory, detect failure of the normal torque sensor and other torque sensor while controlling the motor by using the torque signal from the normal torque sensor, and update the torque sensor failure information stored in the memory, in response to the vehicle being turned off.

The processor may be configured to determine whether the other torque sensor is normal based on the torque sensor failure information, in response to the normal torque sensor failing, use the other torque sensor for a control process, in response to the other torque sensor being normal, and change a mode to a limp home mode or a manual mode, in response to the other torque sensor failing.

In another general aspect, there is provided a method of detecting a failure of a torque sensor for a motor-driven power steering system, the method including storing torque sensor failure information in a memory, selecting, by a processor, a normal torque sensor between a first torque sensor and a second torque sensor based on the torque sensor failure information, in response to a vehicle is turned on, detecting, by the processor, failures of at least one of the normal torque sensor or other torque sensor while controlling a motor of the vehicle by using a torque signal from the normal torque sensor, and updating, by the processor, the torque sensor failure information on the basis of the failure detection result, in response to the vehicle being turned off.

The detecting of the failure may include detecting a failure in the first torque sensor and the second torque sensor on the basis of main torque signals and sub-torque signals of the first torque sensor and the second torque sensor, respectively, comparing a first torque value of the first torque sensor and a second torque value of the second torque sensor, in response to the detection result indicating that the first torque sensor and the second torque sensor are normal, measuring an amount of change in first torque of the first torque sensor and an amount of change in second torque of the second torque sensor by applying electric current to a motor, in response to the comparison result being abnormal, and determining a failure in the first torque sensor and the second torque sensor based on the amount of change in first torque and the amount of change in second torque, respectively.

The detecting of the failure may include determining that the first torque sensor is normal, in response to the amount of change in first torque varying, determining that the first torque sensor is failing, in response to the amount of change in first torque does not varying, determining that the second torque sensor is normal in response to the amount of change in second torque varying, and determining that the second torque sensor is failing, in response to the amount of change in second torque not varying.

The detecting of the failure may include determining whether the other torque sensor is normal based on the information on the failure of the torque sensor, in response to the normal torque sensor being diagnosed with a failure, using the other torque sensor for a control process, in response to the other torque sensor being normal, and changing a mode to a limp home mode or a manual mode, in response to the other torque sensor failing.

Other features and aspects will be apparent from the following detailed description, the drawings, and the claims.

BRIEF DESCRIPTION OF THE DRAWINGS

FIG. 2 is an exemplified view for explaining a method of detecting failures of a first torque sensor and a second torque sensor according to the embodiment of the present disclosure.

Figure 1:
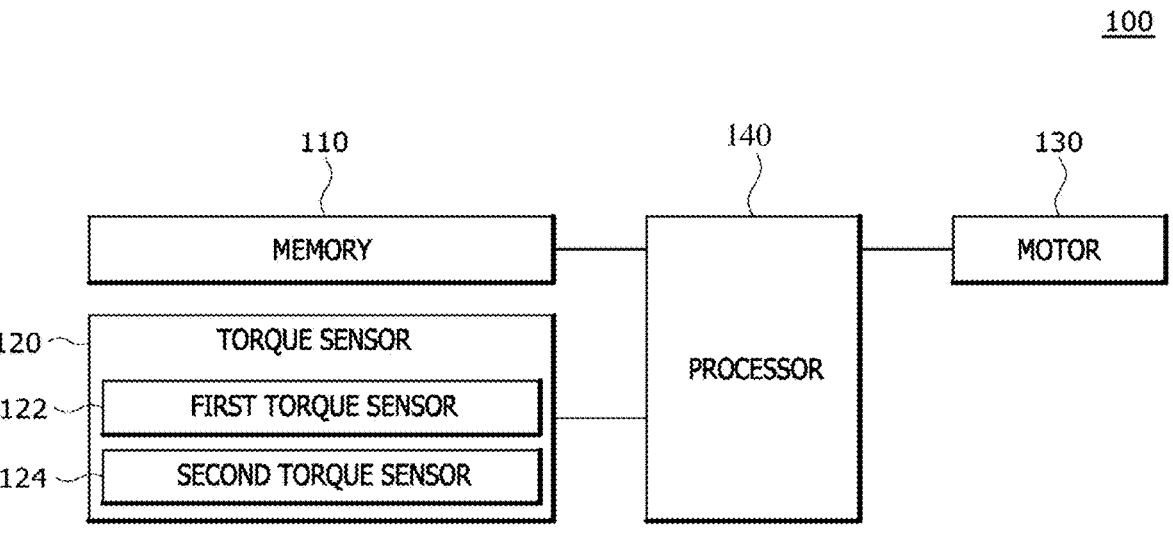
FIG. 1 is a view for explaining an apparatus for detecting a failure of a torque sensor for a motor-driven power steering system according to an embodiment of the present disclosure.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, embodiments that include other components in addition to the components described in the various embodiments are also included in the scope of the present disclosure.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, when a component is referred to as being "linked," "coupled," or "connected" to another component, it is understood that not only a direct connection relationship but also an indirect connection relationship through an intermediate component may also be included. In addition, when a component is referred to as "comprising" or "having" another component, it may mean further inclusion of another component not the exclusion thereof, unless explicitly described to the contrary.

In the present disclosure, the terms first, second, etc. are used only for the purpose of distinguishing one component from another, and do not limit the order or importance of components, etc., unless specifically stated otherwise. Thus, within the scope of this disclosure, a first component in one exemplary embodiment may be referred to as a second component in another embodiment, and similarly a second component in one exemplary embodiment may be referred to as a first component.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, exemplary embodiments that include other components in addition to the components described in the various embodiments are also included in the scope of the present disclosure.

Hereinafter, an apparatus and method for detecting a failure of a torque sensor for a motor-driven power steering system will be described below with reference to the accompanying drawings through various exemplary embodiments.

FIG. 1 is a view for explaining an apparatus for detecting a failure of a torque sensor for a motor-driven power steering system according to an embodiment of the present disclosure, and FIG. 2 is an exemplified view for explaining a method of detecting failures of a first torque sensor and a second torque sensor according to the embodiment of the present disclosure.

Referring to FIG. 1, an apparatus 100 for detecting a failure of a torque sensor for a motor-driven power steering system according to an embodiment of the present disclosure includes a memory 110, torque sensors 120, a processor 140, and a motor 130.

The memory 110 is configured to store data related to operations of the apparatus 100 for detecting a failure of a torque sensor. In particular, the memory 110 may store information on the failure of the torque sensor. In addition, the memory 110 may store applications (programs or applets) and the like that may be used to detect a failure of the torque sensor 120. The pieces of stored information may be selected by the processor 140, as necessary. That is, the memory 110 stores various types of data produced during a process of executing an operating system or an application (a program or an applet) for operating the apparatus 100 for detecting a failure of a torque sensor. In this case, the memory 110 is collectively referred to as a non-volatile storage device configured to continuously maintain the stored information even though no electric power is supplied, and a volatile storage device configured to require electric power to maintain the stored information. In addition, the memory 110 may serve to temporarily or permanently store data to be processed by the processor 140. In this case, the memory 110 may include magnetic storage media or flash storage media in addition to the volatile storage device configured to require electric power to maintain the stored information. However, the scope of the present disclosure is not limited thereto.

The torque sensor 120 may generate an electrical signal by detecting a relative rotational displacement between an input shaft and an output shaft in accordance with a rotation of a steering wheel (not illustrated) and transmit the generated electrical signal to the processor 140. That is, the torque sensor 120 may detect column torque made by a steering operation of the steering wheel and provide the column torque to the processor 140.

The torque sensor 120 has a dualized structure and includes a first torque sensor 122 and a second torque sensor 124. To detect failures of the torque sensors, the first torque sensor 122 is provided as a pair of first torque sensors, and the second torque sensor 124 is provided as a pair of second torque sensors. That is, the first torque sensors 122 may include a first main torque sensor (torque sensor master (TSM)) and a first sub-torque sensor (torque sensor slave (TSS)), and the second torque sensors 124 may include a second main torque sensor and a second sub-torque sensor.

The motor 130 may produce auxiliary power for making steering smooth. The motor 130 may generate preset driving power in a preset direction on the basis of a control signal or electric current supplied from the processor 140. That is, the motor 130 may produce steering assistive power from driving power by being operated by electric current supplied in accordance with auxiliary torque.

The processor 140 may receive a vehicle speed, column torque, a steering angle, and a motor angle from a vehicle speed sensor (not illustrated), the torque sensor 120, a steering angle sensor (not illustrated), and a motor angle sensor (not illustrated), calculate the auxiliary torque, and operate the motor 130. The processor 140 may receive various types of signals from the sensors, recognize a traveling state of the vehicle on the basis of the received signals, and then adjust the amount of electric current flowing through the motor 130, thereby controlling the operation of the motor 130.

In addition, the processor 140 may select the normal torque sensor between the first torque sensor 122 and the second torque sensor 124 on the basis of the torque sensor failure information stored in the memory 110 when the vehicle is turned on, and the processor 140 may detect whether the normal torque sensor and the other torque sensor fail while controlling the motor 130 by using a torque signal from the selected normal torque sensor. In this case, in case that the normal torque sensor is diagnosed with a failure, the processor 140 determines whether the other torque sensor is normal on the basis of the torque sensor failure information. In case that the other torque sensor is normal, the processor 140 may use the other torque sensor for a control process. In case that the other torque sensor fails, the processor 140 may change a mode to a limp home mode or a manual mode.

As illustrated in FIG. 2, the processor 140 may detect whether the first torque sensor 122 and the second torque sensor 124 fail on the basis of main torque signals and sub-torque signals of the first torque sensor 122 and the second torque sensor 124. When the detection result indicates that both the first torque sensor 122 and the second torque sensor 124 are normal, the processor 140 may finally detect whether the first torque sensor 122 and the second torque sensor 124 fail on the basis of a first torque value of the first torque sensor 122 and a second torque value of the second torque sensor 124.

First, the processor 140 may detect whether the first torque sensor 122 and the second torque sensor 124 fail on the basis of the main torque signals and the sub-torque signals of the first torque sensor 122 and the second torque sensor 124.

Specifically, the processor 140 may calculate a first difference that indicates a difference between a column torque value of the first main torque signal of the first torque sensor 122 and a column torque value of the first sub-torque signal of the first torque sensor 122. Thereafter, in case that a state in which the first difference is larger than a preset first reference torque value and equal to or smaller than a preset second reference torque value is maintained for a first reference time or more or in case that a state in which the first difference is larger than the second reference torque value is maintained for a second reference time or more, the processor 140 may diagnose the first torque sensor 122 with a failure. In this case, the column torque value may be a value made by converting the torque voltage value into the column torque value. The first reference torque value may be smaller than the second reference torque value, and the first reference time may be longer than the second reference time.

In addition, the processor 140 may calculate a second difference that indicates a difference between a column torque value of the second main torque signal of the second torque sensor 124 and a column torque value of the second sub-torque signal of the second torque sensor 124. Thereafter, in case that a state in which the second difference is larger than the first reference torque value and equal to or smaller than the second reference torque value is maintained for the first reference time or more or in case that a state in which the second difference is larger than the second reference torque value is maintained for the second reference time or more, the processor 140 may diagnose the second torque sensor 124 with a failure.

When a first failure detection result based on the main torque signals and the sub-torque signals of the first torque sensor 122 and the second torque sensor 124 indicates that both the first torque sensor 122 and the second torque sensor 124 are normal, the processor 140 may detect again whether the first torque sensor 122 and the second torque sensor 124 fail on the basis of the first torque value of the first torque sensor 122 and the second torque value of the second torque sensor 124.

Specifically, the processor 140 may calculate the first torque value on the basis of the column torque value of the first main torque signal of the first torque sensor 122 and the column torque value of the first sub-torque signal of the first torque sensor 122 and calculate the second torque value on the basis of the column torque value of the second main torque signal of the second torque sensor 124 and the column torque value of the second sub-torque signal of the second torque sensor 124. In this case, the processor 140 may calculate, as the first torque value, an average of the column torque value of the first main torque signal and the column torque value of the first sub-torque signal and calculate, as the second torque value, an average of the column torque value of the second main torque signal and the column torque value of the second sub-torque signal.

Thereafter, the processor 140 calculates a third difference that indicates a difference between the first torque value and the second torque value. In case that a state in which the third difference is larger than a preset third reference torque value and equal to or smaller than a preset fourth reference torque value is maintained for a third reference time or more or in case that a state in which the third difference is larger than the fourth reference torque value is maintained for a fourth reference time or more, the processor 140 may determine that the first torque sensor 122 or the second torque sensor 124 is abnormal. In this case, the third reference torque value may be smaller than the fourth reference torque value, and the third reference time may be longer than the fourth reference time.

In case that the state in which the third difference is larger than the preset third reference torque value and equal to or smaller than the preset fourth reference torque value is maintained for the third reference time or more or in case that the state in which the third difference is larger than the fourth reference torque value is maintained for the fourth reference time or more (i.e., in case that a result of comparing the first torque value and the second torque value is abnormal), the processor 140 may measure the amount of change in first torque of the first torque sensor 122 and the amount of change in second torque of the second torque sensor 124 by applying electric current to the motor 130. In this case, the processor 140 may apply the electric current to the motor 130 on the basis of a preset magnitude of electric current and an electric current application time so as to provide a small amount of vibration to a driver without affecting the traveling of the vehicle.

The processor 140 may finally detect whether the first torque sensor 122 and the second torque sensor 124 fail on the basis of the amount of change in first torque and the amount of change in second torque. That is, in case that the amount of change in first torque varies, the processor 140 may determine that the first torque sensor 122 is normal. In case that the amount of change in first torque does not vary, the processor 140 may diagnose the first torque sensor 122 with a failure. In addition, in case that the amount of change in second torque varies, the processor 140 may determine that the second torque sensor 124 is normal. In case that the amount of change in second torque does not vary, the processor 140 may diagnose the second torque sensor 124 with a failure.

In addition, when the vehicle is turned off, the processor 140 may update the torque sensor failure information stored in the memory 110 on the basis of the failure detection result. In this case, the processor 140 may update the torque sensor failure information, as shown in Table 1 below.

mation from the memory 110 and use the torque value of one of the first torque sensor 122 and the second torque sensor 124 as the control signal.

Figure 3:
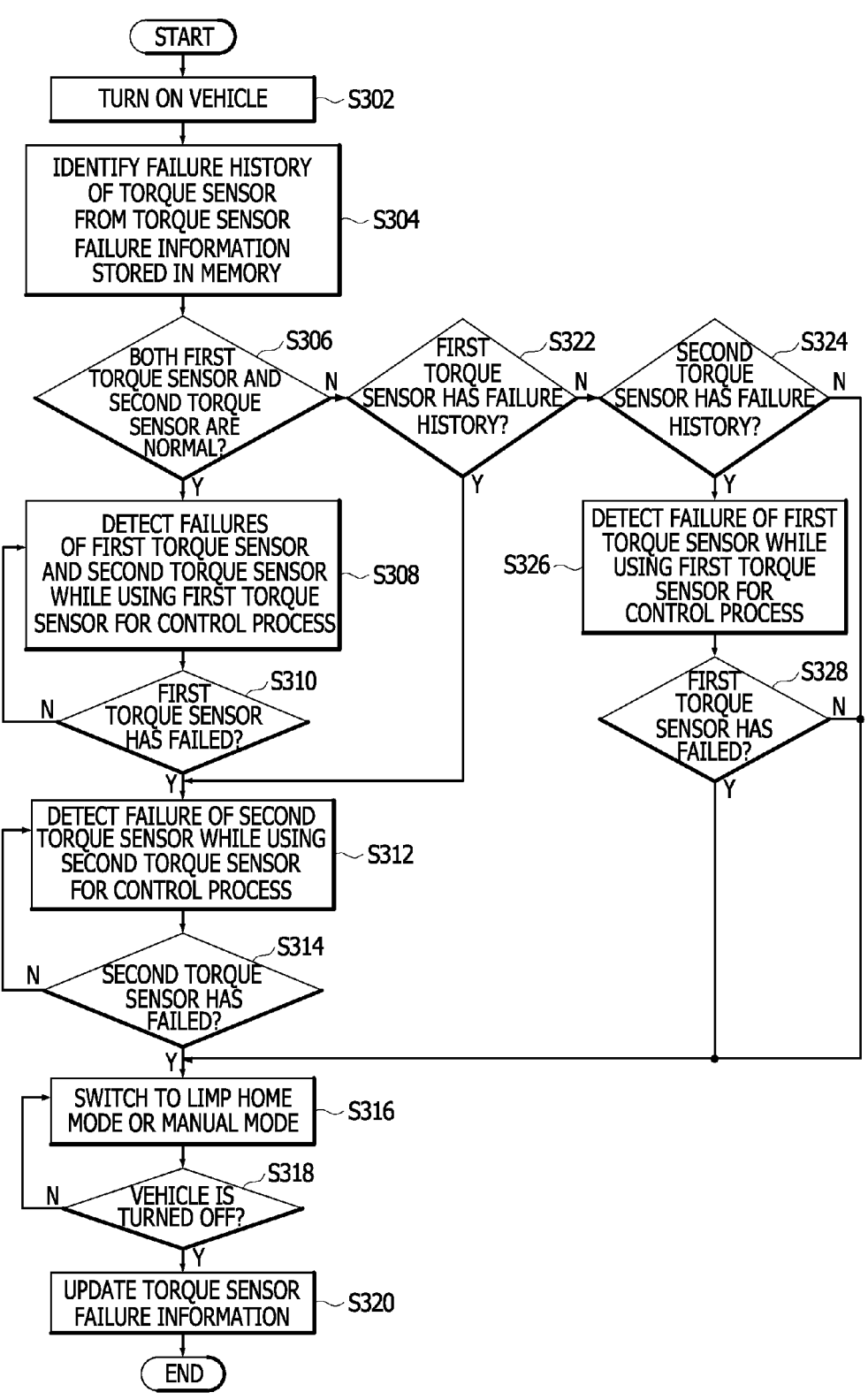
FIG. 3 is a flowchart for explaining a method of detecting a failure of a torque sensor for a motor-driven power steering system according to the embodiment of the present disclosure.

FIG. 3 is a flowchart for explaining a method of detecting a failure of a torque sensor for a motor-driven power steering system according to the embodiment of the present disclosure.

Referring to FIG. 3, when the vehicle is turned on (S302), the processor 140 identifies histories of failures of the first torque sensor 122 and the second torque sensor 124 from the torque sensor failure information stored in the memory 110 (S304).

In case that the identification result in step S304 indicates that both the first torque sensor 122 and the second torque sensor 124 are normal (S306), the processor 140 selects one

TABLE 1

| Classification | First torque sensor | Second torque sensor | Control torque | Remarks |
|---|---|---|---|---|
| First torque sensor | Normal → Failure | Normal | First torque value → Second torque value | 1. Use second torque value as control signal immediately when first torque sensor fail<br>2. Store information on occurrence of failure of first torque sensor in ROM |
| Second torque sensor | Continuous failure | Normal | Second torque value | 1. Read NVM information and use second torque sensor as basic control signal<br>2. Prohibit use of first torque sensor for control process and continue only to detect failure of first torque sensor → continue to check failure of first torque sensor |
| Third torque sensor | Recovery to normal | Normal | Second torque value | 1. Read NVM information and use second torque sensor as basic control signal<br>2. Check removal of failure of first torque sensor 1 → delete information on occurrence of failure of first torque sensor from NVM<br>* Recovery condition: non-detection of failure related to torque sensor for 1 key cycle |
| Fourth torque sensor | Normal | Normal | First torque value or second torque value | Read NVM information and use first torque sensor or second torque sensor as basic control signal |

Referring to Table 1, when the first torque sensor 122 fails during a first operation (traveling) (1st key cycle) of the vehicle, the processor 140 may use the second torque value of the second torque sensor 124 in the normal state as a control signal immediately when the first torque sensor 122 fails. When the vehicle is turned off, the processor 140 may store the information on the occurrence of the failure of the first torque sensor 122 in the memory 110.

Thereafter, when the vehicle is turned on (2st key cycle), the processor 140 may read the torque sensor failure information from the memory 110 and use the second torque value of the second torque sensor 124 as the control signal. In this case, because the first torque sensor 122 is in the failed state, the processor 140 does not use the first torque sensor 122 and may continuously detect the failure of the first torque sensor 122. When the vehicle is turned off, the processor 140 may maintain the torque sensor failure information stored in the memory 110.

Thereafter, when the vehicle is turned on (3st key cycle), the processor 140 may read the torque sensor failure information from the memory 110 and use the second torque value of the second torque sensor 124 as the control signal. When the first torque sensor 122 is recovered to the normal state, the processor 140 may delete (remove) the information of the occurrence of the failure of the first torque sensor 122 from the memory 110 when the vehicle is turned off.

Thereafter, when the vehicle is turned on (4st key cycle), the processor 140 may read the torque sensor failure inforof the first torque sensor 122 and the second torque sensor 124 and detects the failures of the first torque sensor 122 and the second torque sensor 124 while using the selected torque sensor for the control process (S308). Hereinafter, for convenience of description, the following description is made on the assumption that the first torque sensor 122 is used first in case that both the first torque sensor 122 and the second torque sensor 124 are normal. That is, the processor 140 may use the first torque value from the first torque sensor 122 as the control signal. A detailed description related to a method of detecting, by the processor 140, whether the first torque sensor 122 and the second torque sensor 124 fail will be described with reference to FIG. 4.

In case that the failure detection result in step S308 indicates that the first torque sensor 122 fails (S310), the processor 140 detects the failure of the second torque sensor 124 while using the second torque sensor 124 for the control process (S312). In this case, the processor 140 may use the second torque value from the second torque sensor 124 as the control signal. In addition, the processor 140 may calculate the second difference that indicates a difference between the column torque value of the second main torque signal of the second torque sensor 124 and the column torque value of the second sub-torque signal of the second torque sensor 124. In case that the state in which the second difference is larger than the first reference torque value and equal to or smaller than the second reference torque value is maintained for the first reference time or more or in case that the state in which the second difference is larger than the second reference torque value is maintained for the second reference time or more, the processor 140 may diagnose the second torque sensor 124 with a failure.

In case that the failure detection result in step S312 indicates that the second torque sensor 124 fails (S314), the processor 140 is switched to the limp home mode or the manual mode (S316).

Thereafter, when the vehicle is turned off (S318), the processor 140 updates the torque sensor failure information (S320). That is, the processor 140 may store the information of the occurrence of the failures of the first torque sensor 122 and the second torque sensor 124 in the memory 110. In addition, in case that the torque sensor having no failure history fails, the processor 140 may store the failure information on the torque sensor, which fails, in the memory 110. In addition, in case that the torque sensor having a past failure history is recovered to the normal state during the operation of the vehicle, the processor 140 may delete the failure history of the corresponding torque sensor that is stored in the memory 110.

In case that the identification result in step S304 indicates that the first torque sensor 122 has the failure history (S322), the processor 140 performs step S314.

In case that the identification result in step S304 indicates that the second torque sensor 124 has the failure history (S324), the processor 140 detects the failure of the first torque sensor 122 while using the first torque sensor 122 for the control process (S326). In this case, the processor 140 may calculate the first difference between the column torque value of the first main torque signal of the first torque sensor 122 and the column torque value of the first sub-torque signal of the first torque sensor 122. In case that the state in which the first difference is larger than the preset first reference torque value and equal to or smaller than the preset second reference torque value is maintained for the first reference time or more or in case that the state in which the first difference is larger than the second reference torque value is maintained for the second reference time or more, the processor 140 may diagnose the first torque sensor 122 with a failure.

In case that the failure detection result in step S326 indicates that the first torque sensor 122 fails (S328), the processor 140 performs step S316.

As described above, when the vehicle is turned on, the processor 140 may use the first torque sensor 122 (or the second torque sensor 124) first for the control process between the normal first torque sensor 122 and the normal second torque sensor 124. When the first torque sensor 122 fails, the processor 140 may perform the control process by using the torque signal from the second torque sensor 124. Thereafter, when the vehicle is turned off, the processor 140 may store the failure information on the first torque sensor 122, which fails, in the memory 110.

Thereafter, when the vehicle is turned on again, the processor 140 may read the torque sensor failure information from the memory 110, and may perform the control process by using the torque sensor having no past failure history even though both the first torque sensor 122 and the second torque sensor 124 are currently normal. That is, because the first torque sensor 122 fails, the processor 140 may perform the control process by using the second torque sensor 124. When the second torque sensor 124 fails, the processor 140 may diagnose the first torque sensor 122 and the second torque sensor 124 with failures and operate in the manual mode.

In addition, in case that the result of detecting whether the torque sensor having the past failure history fails during the current key cycle indicates that the corresponding torque sensor has no failure, the processor 140 may delete the failure history of the corresponding torque sensor, which is stored in the memory 110, when the vehicle is turned off.

Figure 4:
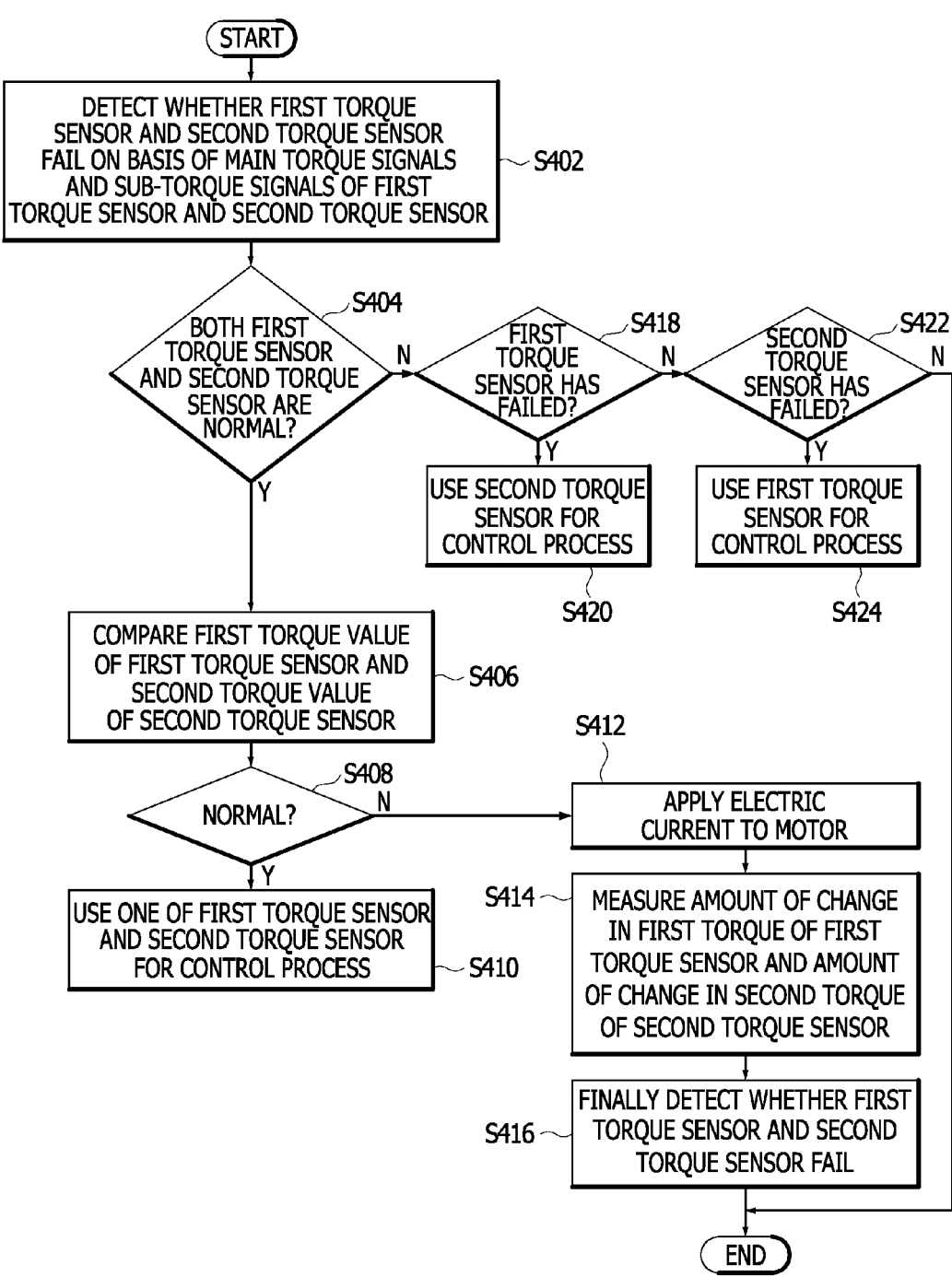
FIG. 4 is a flowchart for explaining a method of detecting a failure of a torque sensor according to the embodiment of the present disclosure.

FIG. 4 is a flowchart for explaining a method of detecting a failure of a torque sensor according to the embodiment of the present disclosure.

Referring to FIG. 4, the processor 140 detects whether the first torque sensor 122 and the second torque sensor 124 fail on the basis of the main torque signals and the sub-torque signals of the first torque sensor 122 and the second torque sensor 124 (S402). That is, the processor 140 may calculate the first difference that indicates the difference between the column torque value of the first main torque signal of the first torque sensor 122 and the column torque value of the first sub-torque signal of the first torque sensor 122. Thereafter, in case that the state in which the first difference is larger than the preset first reference torque value and equal to or smaller than the preset second reference torque value is maintained for the first reference time or more or in case that the state in which the first difference is larger than the second reference torque value is maintained for the second reference time or more, the processor 140 may diagnose the first torque sensor 122 with a failure. In addition, the processor 140 may calculate the second difference that indicates the difference between the column torque value of the second main torque signal of the second torque sensor 124 and the column torque value of the second sub-torque signal of the second torque sensor 124. Thereafter, in case that the state in which the second difference is larger than the first reference torque value and equal to or smaller than the second reference torque value is maintained for the first reference time or more or in case that the state in which the second difference is larger than the second reference torque value is maintained for the second reference time or more, the processor 140 may diagnose the second torque sensor 124 with a failure.

When the detection result in step S402 indicates that both the first torque sensor 122 and the second torque sensor 124 are normal (S404), the processor 140 compares the first torque value of the first torque sensor 122 and the second torque value of the second torque sensor 124 (S408) and determines whether the comparison result is normal (S408). The processor 140 may calculate the first torque value on the basis of the column torque value of the first main torque signal of the first torque sensor 122 and the column torque value of the first sub-torque signal of the first torque sensor 122 and calculate the second torque value on the basis of the column torque value of the second main torque signal of the second torque sensor 124 and the column torque value of the second sub-torque signal of the second torque sensor 124. In this case, the processor 140 may calculate, as the first torque value, the average of the column torque value of the first main torque signal and the column torque value of the first sub-torque signal and calculate, as the second torque value, the average of the column torque value of the second main torque signal and the column torque value of the second sub-torque signal. Thereafter, the processor 140 may calculate the third difference that is the difference between the first torque value and the second torque value and determine whether the state in which the third difference is larger than the third reference torque value and equal to or smaller than the fourth reference torque value is maintained for the third reference time or more or the state in which the third difference is larger than the fourth reference torque value is maintained for the fourth reference time or more. In case that the determination result indicates that the state in which the third difference is larger than the third reference torque value and equal to or smaller than the fourth reference torque value is maintained for the third reference time or more or the state in which the third difference is larger than the fourth reference torque value is maintained for the fourth reference time or more, the processor 140 may determine that the first torque sensor 122 or the second torque sensor 124 is abnormal.

When the determination result in step S408 indicates that the result of comparing the first torque value and the second torque value is normal, the processor 140 uses one of the first torque sensor 122 and the second torque sensor 124 for the control process (S410).

When the determination result in step S406 indicates that the result of comparing the first torque value and the second torque value is abnormal, the processor 140 applies the electric current to the motor 130 (S412) and measures the amount of change in first torque of the first torque sensor 122 and the amount of change in second torque of the second torque sensor 124 (S414). In this case, the processor 140 may apply the electric current to the motor 130 on the basis of a preset magnitude of electric current and an electric current application time so as to provide a small amount of vibration to the driver. The processor 140 may measure the amount of change in first torque of the first torque sensor 122 and the amount of change in second torque of the second torque sensor 124 in accordance with the application of the electric current.

When step S414 is performed, the processor 140 determines whether the first torque sensor 122 fails on the basis of the amount of change in first torque and finally detects whether the second torque sensor 124 fails on the basis of the amount of change in second torque (S416). That is, in case that the amount of change in first torque varies, the processor 140 may determine that the first torque sensor 122 is normal. In case that the amount of change in first torque does not vary, the processor 140 may diagnose the first torque sensor 122 with a failure. In addition, in case that the amount of change in second torque varies, the processor 140 may determine that the second torque sensor 124 is normal. In case that the amount of change in second torque does not vary, the processor 140 may diagnose the second torque sensor 124 with a failure.

If the detection result in step S402 indicates that the first torque sensor 122 fails (S418), the process uses the second torque sensor 124 for the control process (S420).

If the detection result in step S402 indicates that the second torque sensor 124 fails (S422), the process uses the first torque sensor 122 for the control process (S424).

As described above, the apparatus and method for detecting a failure of a torque sensor for a motor-driven power steering system according to one aspect of the present disclosure may detect whether the first torque sensor and the second torque sensor fail on the basis of the main torque signals and the sub-torque signals of the first torque sensor and the second torque sensor. In case that the detection result indicates that the first torque sensor and the second torque sensor are normal, the apparatus and method may compare the first torque value of the first torque sensor and the second torque value of the second torque sensor and detect again whether the first torque sensor and the second torque sensor fail. Therefore, it is possible to normally detect the failure of the torque sensor when the torque signal within the normal range set for the detection of the failure is transmitted even though the torque sensor is damaged by external environmental factors. Therefore, the present disclosure may solve the problem of self-rotation caused when a fixed torque value within a normal range is outputted. Further, the present disclosure may improve stability of the vehicle and driver.

The apparatus and method for detecting a failure of a torque sensor for a motor-driven power steering system according to one aspect of the present disclosure may store the failure information on the torque sensor that fails during the current operation of the vehicle, and then operate the torque sensor applied as redundancy on the basis of the failure information on the torque sensor stored in the previous cycle when the vehicle is turned on again, which makes it possible to effectively cope with the occurrence of the failure of the torque sensor.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An apparatus for detecting a failure of a torque sensor for a motor-driven power steering system, the apparatus comprising:

a first torque sensor and a second torque sensor; and a processor configured to determine whether a failure exists in the first torque sensor and the second torque sensor based on main torque signals and sub-torque signals of the first torque sensor and the second torque sensor, respectively, wherein, in response to a determination that no failure exists in the first torque sensor and the second torque sensor, the processor is further configured to:

compare a first torque value of the first torque sensor with a second torque value of the second torque sensor, and determine whether a result of the comparison is abnormal;

in response to the comparison result being abnormal, apply an electric current to a motor of the motor-driven power steering system, the electric current having a predetermined magnitude and being applied for a predetermined time to provide a small amount of vibration in the steering system, to measure an amount of change in a first torque of the first torque sensor and an amount of change in a second torque of the second torque sensor; and determine a failure in the first torque sensor and the second torque sensor based on the respective amounts of change in the first torque and the second torque, wherein applying the electric current to the motor to determine the failure is performed only when a difference between the first torque value and the second torque value exceeds a third reference torque value and is less than or equal to a fourth reference torque value for at least a third reference time, or when the difference exceeds the fourth reference torque value for at least a fourth reference time.

2. The apparatus of claim 1, wherein the processor is further configured to:

calculate a first difference between a column torque value of a first main torque signal of the first torque sensor and a column torque value of a first sub-torque signal of the first torque sensor; and diagnose the first torque sensor with a failure, in response to the first difference being larger than a first reference torque value and equal to or smaller than a second reference torque value for a first reference time or more or in response to the first difference being larger than the second reference torque value for a second reference time or more.

3. The apparatus of claim 2, wherein the processor is further configured to:

calculate a second difference between a column torque value of a second main torque signal of the second torque sensor and a column torque value of a second sub-torque signal of the second torque sensor; and diagnose the second torque sensor with a failure, in response to the second difference being larger than the first reference torque value and equal to or smaller than the second reference torque value for the first reference time or more or in response to the second difference being larger than the second reference torque value for the second reference time or more.

4. The apparatus of claim 3, wherein the first reference torque value is smaller than the second reference torque value, and wherein the first reference time is longer than the second reference time.

5. The apparatus of claim 1, wherein the processor is further configured to:

calculate the first torque value based on a column torque value of a first main torque signal of the first torque sensor and a column torque value of a first sub-torque signal of the first torque sensor; and calculate the second torque value based on a column torque value of a second main torque signal of the second torque sensor and a column torque value of a second sub-torque signal of the second torque sensor.

6. The apparatus of claim 1, wherein the processor is further configured to:

determine that the first torque sensor is normal, in response to the amount of change in first torque varying;

determine that the first torque sensor is failing, in response to the amount of change in first torque not varying;

determine that the second torque sensor is normal, in response to the amount of change in second torque varying; and determine that the second torque sensor fails, in response to the amount of change in second torque not varying.

7. The apparatus of claim 1, wherein the third reference torque value is smaller than the fourth reference torque value, and wherein the third reference time is longer than the fourth reference time.

8. The apparatus of claim 1, wherein in response to a vehicle being turned on, the processor is further configured to:

select a normal torque sensor between the first torque sensor and the second torque sensor on the basis of torque sensor failure information stored in a memory;

detect failure of the normal torque sensor and other torque sensor while controlling the motor by using the torque signal from the normal torque sensor; and update the torque sensor failure information stored in the memory, in response to the vehicle being turned off.

9. The apparatus of claim 8, wherein the processor is further configured to:

determine whether the other torque sensor is normal based on the torque sensor failure information, in response to the normal torque sensor failing;

use the other torque sensor for a control process, in response to the other torque sensor being normal; and change a mode to a limp home mode or a manual mode, in response to the other torque sensor failing.

10. A processor-implemented method of detecting a failure of a torque sensor for a motor-driven power steering system of a vehicle, the method comprising:

storing torque sensor failure information in a memory;

in response to a detection result indicating that a first torque sensor and a second torque sensor are normal, comparing a first torque value of the first torque sensor with a second torque value of the second torque sensor, and determining whether a result of the comparison is abnormal;

in response to the comparison result being abnormal, applying an electric current to a motor of the motor-driven power steering system, the electric current having a predetermined magnitude and being applied for a predetermined time to provide a small amount of vibration in the steering system, to measure an amount of change in the first torque of the first torque sensor and an amount of change in the second torque of the second torque sensor;

selecting, by a processor, a normal torque sensor from among the first torque sensor and the second torque sensor, in response to the vehicle being turned on;

detecting, by the processor, a failure of at least one of the normal torque sensor or the other torque sensor while controlling the motor using a torque signal from the normal torque sensor; and updating, by the processor, the torque sensor failure information based on a failure detection result, in response to the vehicle being turned off, wherein applying the electric current to the motor to determine the failure is performed only when a difference between the first torque value and the second torque value exceeds a third reference torque value and is less than or equal to a fourth reference torque value for at least a third reference time, or when the difference exceeds the fourth reference torque value for at least a fourth reference time.

11. The method of claim 10, wherein the detecting of the failure further comprises:

detecting a failure in the first torque sensor and the second torque sensor on the basis of main torque signals and sub-torque signals of the first torque sensor and the second torque sensor, respectively.

12. The method of claim 10, wherein the detection of the failure comprises:

determining whether the other torque sensor is normal based on the information on the failure of the torque sensor, in response to the normal torque sensor being diagnosed with a failure;

using the other torque sensor for a control process, in response to the other torque sensor being normal; and changing a mode to a limp home mode or a manual mode, in response to the other torque sensor failing.

* * * * *